United States Patent
Moss et al.

(10) Patent No.: US 7,272,219 B2
(45) Date of Patent: *Sep. 18, 2007

(54) METHOD AND SYSTEM FOR PROVIDING ENHANCED CALLER IDENTIFICATION INFORMATION FOR SUBSCRIBERS THAT INTERFACE VIA PRIVATE TRUNK GROUPS

(75) Inventors: John Wesley Moss, Lake Zurich, IL (US); Dianna Inara Tiliks, Elk Grove, IL (US); Susanne Marie Crockett, Buffalo Grove, IL (US); Carol Shifrin Gruchala, Naperville, IL (US); Nancy Ann Book, Naperville, IL (US)

(73) Assignee: AT&T Knowledge Ventures, L.P., Reno, NV (US)

(*) Notice: Subject to any disclaimer, the term of this patent is extended or adjusted under 35 U.S.C. 154(b) by 305 days.

This patent is subject to a terminal disclaimer.

(21) Appl. No.: 10/931,283

(22) Filed: Aug. 31, 2004

(65) Prior Publication Data

US 2005/0078811 A1    Apr. 14, 2005

Related U.S. Application Data

(63) Continuation of application No. 10/036,950, filed on Dec. 21, 2001, now Pat. No. 6,807,267.

(51) Int. Cl.
*H04M 3/42* (2006.01)

(52) U.S. Cl. ............ 379/207.15; 379/207.13; 379/207.14; 379/210.02; 379/210.03

(58) Field of Classification Search ........... 379/207.15, 379/207.13, 207.14, 210.02, 210.03
See application file for complete search history.

(56) References Cited

U.S. PATENT DOCUMENTS

| | | | |
|---|---|---|---|
| 5,425,090 A | | 6/1995 | Orriss |
| 5,533,106 A | * | 7/1996 | Blumhardt ............. 379/142.02 |
| 5,590,184 A | | 12/1996 | London |
| 5,729,592 A | | 3/1998 | Frech et al. |
| 5,825,868 A | | 10/1998 | Diamond |
| 6,049,594 A | | 4/2000 | Furman et al. |
| 6,058,176 A | | 5/2000 | Pickeral et al. |
| 6,178,232 B1 | | 1/2001 | Latter et al. |
| 6,233,325 B1 | | 5/2001 | Frech et al. |
| 6,272,496 B1 | | 8/2001 | Lennert et al. |
| 6,289,084 B1 | | 9/2001 | Bushnell |
| 6,459,780 B1 | | 10/2002 | Wurster et al. |

OTHER PUBLICATIONS

Advanced Services Platform (ASP) Internetworking, Lucent Technologies, Bell Labs Innovations, printed from the internet Oct. 12, 2001, www.lucent.com, 6 pages.

* cited by examiner

*Primary Examiner*—Quynh H. Nguyen
(74) *Attorney, Agent, or Firm*—Brinks, Hofer, Gilson & Lione

(57) ABSTRACT

A system and method deliver audible caller identification information when standard Caller ID information is invalid or can not be provided, even when the called party connects to the network by private trunk group facilities. In one disclosed embodiment, a trunk group trigger associated with the called communication station is encountered, launching a termination attempt query. If standard caller identification information can not be provided for the calling party, the call will be routed to a privacy service to obtain the audible caller identification information.

11 Claims, 2 Drawing Sheets ical diagram of a telecommunications system">

METHOD AND SYSTEM FOR PROVIDING ENHANCED CALLER IDENTIFICATION INFORMATION FOR SUBSCRIBERS THAT INTERFACE VIA PRIVATE TRUNK GROUPS

RELATED APPLICATIONS

The present patent document is a continuation of U.S. application Ser. No. 10/036,950, filed Dec. 21, 2001, now U.S. Pat. No. 6,807,267, which is hereby incorporated herein in its entirety by this reference.

BACKGROUND

The present invention relates generally to telecommunications services. More particularly, the present application relates to a method and system for providing enhanced caller identification information even to subscribers who interface the telecommunication network via private trunk group facilities.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. This may occur, for example, if the calling party pressed *67 when initiating the call When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

U.S. patent application Ser. No. 09/122,484, filed Jul. 24, 1998, issued Jan. 23, 2001 as U.S. Pat. No. 6,178,232 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999 and issued Dec. 12, 2000 as U.S. Pat. No. 6,160,876, is also incorporated herein by reference. This application discloses a method for providing enhanced caller identification information when per line blocking of Caller ID is present. When per line blocking is activated for a subscriber line, the Caller ID information for that line is never transmitted by the system.

In the systems disclosed in the incorporated patent applications, subscribers that interface with network equipment via private Trunk Group facilities can not benefit from those systems. In some embodiments of those systems, network equipment such as a Service Switching Point (SSP) encounters a terminating attempt trigger when processing a call to a called communication station over a conventional subscriber loop. Encountering the terminating attempt trigger initiates the process of routing the call to a privacy service for obtaining audible caller identification information. However, in the case where the subscriber interfaces with the network over private Trunk Group facilities, the terminating attempt trigger is never encountered.

Examples of private Trunk Group facilities includes private branch exchanges (PBXs), which are used for example, to provide telecommunication service to a plurality of directory numbers, for example at a business. The result is that subscribers who access the telecommunication network over such private facilities can not enjoy the benefits of privacy service in which callers must provide either standard or audible caller identification information.

Accordingly, there is a need for a system and method which permit subscribers using private facilities to detect and suspend a call for which the standard calling party information can not be provided, before the call is communicated to the called party.

DETAILED DESCRIPTION OF THE PRESENTLY PREFERRED EMBODIMENTS

By way of introduction, the preferred embodiments below include a method and system for providing a called party with audible caller identification information when standard caller identification information cannot be provided. In one embodiment, calls for which standard caller identification information is blocked, unavailable or incomplete are prevented from being connected to the called party. If the called party directory number indicates that the called party is associated with a private trunk group or otherwise does not encounter a Terminating Attempt trigger, the call encounters a Trunk Group Trigger, prompting generation of a termination attempt message. The termination attempt message is analyzed to determine if standard caller identification information can be provided for the calling party. In one embodiment, a forward call message is transmitted with the directory number of the called party contained in a normally unused data field. A presentation indicator for the directory number is set in the forward call message to presentation allowed so that blocking of the called party's identification information does not occur.

In response to the forward call message, a request for audible caller identification information is transmitted to the calling party. If the calling party provides the requested audible caller identification information, the audible information is transmitted to the called party. Caller identification information can thus be provided to the called party when standard caller identification information cannot be provided.

Figure 1:
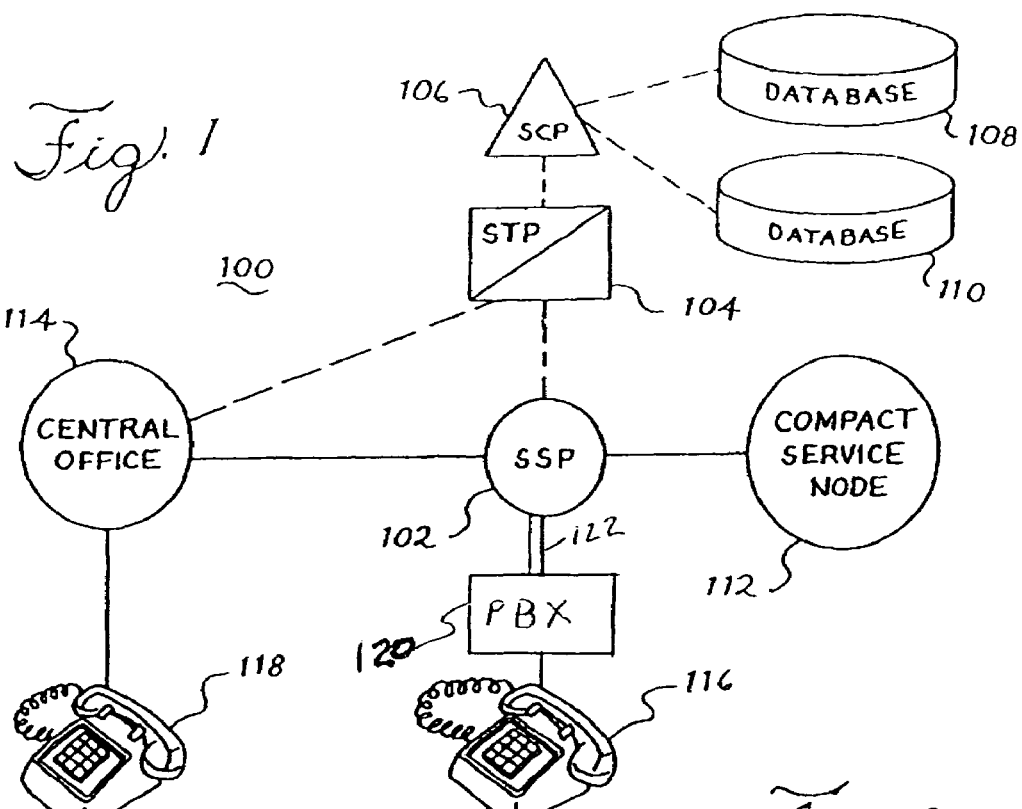
FIG. 1 is a block diagram of a telecommunications system.

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116, calling telephone station 118 and a private branch exchange (PBX) 120. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information. SSP 102 connects to PBX 120 and called telephone station 116 over private Trunk Group lines 122. Other type of private facilities or public trunk groups may be substituted for the PBX 120 and the private Trunk Group lines 122 in other embodiments. The SSP 102 connects the PBX 120 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 106 and receives and responds to responses to the queries returned from SCP 106. In the illustrated embodiment, communication between the SSP 102 and the SCP 106 employs Transaction Capabilities Applications Protocol or TCAP. Examples of a suitable switch for embodying the SSP 102 are the 5ESS switch available from Lucent Technologies and the DMS-100 switch available from Nortel Networks.

STP 104 preferably comprises a network element that transfers signaling communications in response to signaling protocols such as SS7 or other such signaling protocols as presently known to those skilled in the art or developed in the future. STP 104 preferably transfers queries from SSP 102 to SCP 106 and transfers responses to the queries from SCP 106 to SSP 102.

SCP 106 preferably comprises an AIN element that stores account information, call information and receives and responds to queries. SCP 106 preferably stores account information about a called party's account as well as call control information in the first SCP database 108 and can access the stored information. SCP 106 also stores standard caller identification information in the second SCP database 110 and can access the stored caller identification information. SCP 106 receives queries generated by SSP 102 and preferably responds to the queries by performing database searches to locate the requested call control or account information or caller identification information as known to those skilled in the art. SCP 106 can forward the call control or account information or caller identification information to SSP 102.

CSN 112 preferably comprises a network element that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. These components and others which are operationally equivalent may be substituted for the CSN 112 in FIG. 1.

Database 108 preferably comprises a data storage element for use with SCP 106 as known to those skilled in the art. Database 108 preferably stores account and call control information that can be implemented by SSP 102 to control calls. Such account and call control information is known to those skilled in the art.

Database 10 preferably comprises a standard caller identification with name database as known to those skilled in the art. When the information is available in the system, database 110 typically includes the name of the person associated with calling telephone station 118, along with the telephone number that is associated with calling telephone station 118. Database 110 can alternatively comprise a caller assistance database as known to those skilled in the art. While databases 108, 110 are depicted within a telecommunications system, databases 108, 110 can comprise any suitable databases containing information adapted for use in the present embodiment and are not limited to databases located within a telecommunications network. It is also important to note that while databases 108, 110 are shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise telephone sets as known to those skilled in the art. The calling telephone station 118 can be an analog telephone or, if associated with a subscriber line such as an ISDN line, can be a digital telephone. The called telephone station 116 may be a digital or analog telephone but in the illustrated embodiment is a digital telephone which communicates using digital signals with the PBX 120. Alternatively, telephone stations 116, 118 can comprise wireless, PCS, ISDN or any other form of communication station known to those skilled in the art. In wireless embodiments, the PBX 120 may be replaced with a mobile switching center (MSC) or other private equipment accessed over private trunk facilities such as private Trunk Group 122. Called telephone station 116 preferably includes CPE equipment for use with caller identification services as known to those skilled in the art.

Figure 2:
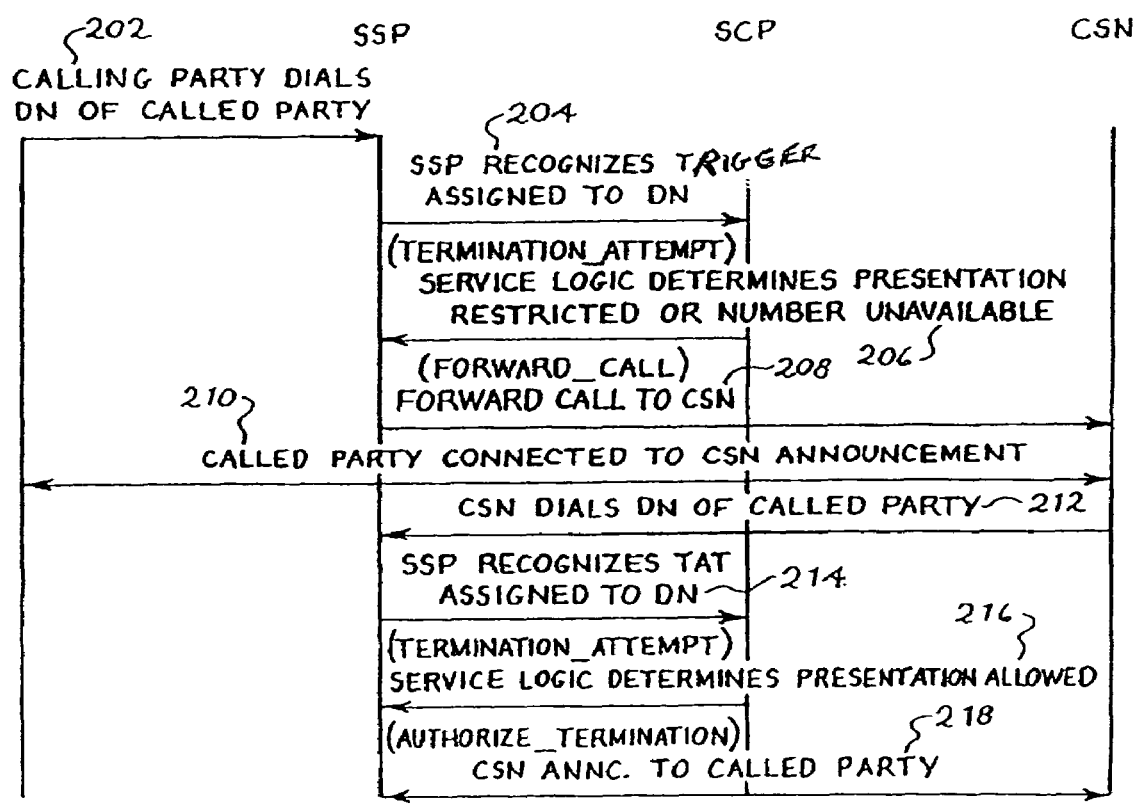
FIG. 2 is a call flow diagram illustrating a method for processing a call in the telecommunications system of FIG. 1.

FIG. 2 is a call flow diagram illustrating a method for processing a call in the telecommunication system 100 of FIG. 1. FIG. 2 illustrates communication between SSP 102, SCP 106 and CSN 112 for processing the call.

At step 202, the calling party at the calling telephone station 118 calls the directory number (DN) of the called communication station 116. The calling party may choose to enable Calling Number Delivery Blocking, for example, by dialing *67 before dialing the DN of the called communication station 116. This will block delivery of the standard caller ID information for the calling telephone station 118. In some systems, portions of the telecommunications system 100 such as the trunk group terminating the call may not pass the standard Caller ID information.

At step 204, the terminating SSP 102 recognizes that a trigger is assigned to the called directory number. If the called communication station 116 is a conventional analog telephone accessed over a conventional subscriber loop, the trigger assigned to the called directory number is a Terminating_Attempt Trigger. The Terminating_Attempt Trigger is encountered by the SSP 102 when the call directed to the directory number for the called telephone station is processed. If, as is shown in the illustrated embodiment, the called communication station 116 accesses the network over private Trunk Group facilities such as the PBX 120 and Trunk Group 122, the trigger associated with the called directory number is a Trunk_Group Trigger. All incoming calls on trunks associated with the directory number (DN) for the called communication station 116 that terminate over private trunk group facilities will encounter a Trunk_Group Trigger. The Trunk_Group Trigger is encountered by the SSP 102 either on public or private facility trunk groups. If the SSP can not derive enough information from the trunk group, it can obtain needed information from trigger line attributes associated with the trigger. The SSP 102 encounters the Trunk_Group Trigger when a call is routed to the subscribed trunk group.

In response to the either the Terminating_Attempt Trigger or the Trunk_Group Trigger, the SSP 102 creates a Termination_Attempt query message and transmits the query message to the SCP 106 for analysis. In the illustrated embodiment using AIN elements, the query message is formatted according to AIN Release 0.1 TCAP. The query message includes several parameters as is known to those ordinarily skilled in the art. For the Termination_Atttempt query message, the following parameters are specified, with specific parameters defined for instances of encountering either a Termination_Attempt trigger or a Trunk_Group trigger:

| | |
|---|---|
| UserID | DN to which the trigger is assigned (Called DN) |
| BearerCapability | 01 (3.1 KHz) |
| CalledPartyID | DN to which the trigger is assigned (Called DN) |
| Lata | Local Access and Transport Area of Called DN |
| TriggerCriteriaType | 15 (terminating attempt, if a Terminating_Attempt trigger was encountered) 48 (terminating attempt, if a Trunk_Group trigger was encountered) |
| CalledPartyStationType | Originating Line Information of the Called DN |
| ChargeNumber | ANI of the originating facility or ANI of last forwarding station, if available |
| CallingPartyID | DN of the calling party (if available) |
| Presentation Restriction | 01 (Presentation Restricted) 10 (Number Unavailable) 00 (Presentation allowed) |
| ChargePartyStationType | Originating Line Information of the calling DN |
| OriginalCalledPartyID | First party that redirected the call |
| RedirectingPartyID | Last party that redirected the call |

The Termination_Attempt trigger is assignable on a subscribed basis to a directory number only. The trigger is assignable to either equipped or unequipped directory numbers. The Trunk_Group trigger is assignable on a subscribed basis to a private facility or public trunk group.

If the calling party has blocked the standard Caller ID information, or if the system does not pass the standard Caller ID information for the calling communication station, the CallingPartyID parameter of the Termination_Attempt query message will not be available. The Presentation Restriction Indicator parameter will be set to one of the binary values 01 or 10 to indicate this condition. This is in contrast to the situation in which the standard Caller ID information is available and the Presentation Restriction Indicator parameter is set to 00, to indicate presentation allowed.

In response to the Termination_Attempt query, the SCP 106 will validate the Presentation Restriction Indicator parameter of the CallingPartyID parameter. If the indicator is set to Presentation Restriction (01) or Number Unavailable (10), the SCP 106 will pass routing information to the SSP 102 in a Forward_Call response message, step 206. In another embodiment, the SCP 106 will examine account information stored at the database 108. If the account information indicates that the called party is a subscriber to privacy service, the SCP 106 will pass call control information in the Forward_Call response message indicating this to the SSP 102. If the called party is not a subscriber, the SCP 106 will return an Authorize_Termination response message to SSP 102.

In the illustrated embodiment using AIN elements, the response message is formatted according to AIN Release 0.1 TCAP. The response message includes several parameters as is known to those ordinarily skilled in the art.

In a first embodiment, for the Forward_Call query message, the following parameters are specified:

| | |
|---|---|
| CallingPartyID | DN to which the TAT is assigned and the DN associated with the Trunk_Group Trigger (Called DN from the Termination_Attempt query with presentation allowed) |
| CalledPartyID | Lead DN from the ISDN trunk group connecting the CSN; customer-selected language or format option |
| PrimaryCarrier | 0110 (LEC) |
| AMAslpID | 008780000 (uniquely identifies a service and indicates flat rate) |

Thus, in this first embodiment, the SCP 106 detects the CalledPartyID parameter of the Termination_Attempt query received from the SSP 102. As noted above, this parameter is set to the DN of the called party, or the directory number of the called telephone station. The SCP 106 places this value in the Forward_Call response for the CallingPartyID parameter. The CallingPartyID parameter of the Forward_Call response has an associated Presentation Restriction Indicator parameter. The SCP 106 marks this Presentation Restriction Indicator as presentation allowed. The SCP 106 sets a parameter in the call forward message indicating that a customer selected request message may be used for the input. To indicate the customer-selected language or format option, an existing parameter of the Forward_Call query message is set to a predetermined value. For example, this information may be incorporated in spare bits such as the last five digits of the CalledPartyID. Any other suitable parameter may be used for passing this information.

In a second embodiment, a different parameter is used in the Forward_Call response message for communicating the called telephone station's DN. This parameter is the RedirectingPartyID. In this embodiment, the SCP 106 places the CalledPartyID DN from the Termination_Attempt query message into the RedirectingPartyID of the Forward_Call response message. The RedirectingPartyID has an associated Presentation Restriction Indicator parameter. The SCP 106 sets the associated Presentation Restriction Indicator parameter to presentation allowed. In this embodiment, the Forward_Call query message has parameters specified as follows:

| | |
|---|---|
| CallingPartyID | DN of the Calling Party (if available) |
| CalledPartyID | Lead DN from the ISDN trunk group connecting the CSN |
| PrimaryCarrier | 0110 (LEC) |
| RedirectingPartyID | DN to which the TAT is assigned or the DN associated with the Trunk_Group Trigger (Called DN from the termination_attempt query) with presentation allowed (overwrites redirection information that the SSP would normally provide); customer-selected language or format option |
| AMAslpID | 008780000 (uniquely identifies a service and indicates flat rate) |

At step 208, the SSP 102 receives the Forward_Call response message and originates a new call for the forwarded leg. The SSP 102 merges the new originating call and the existing terminating call. That is, the SSP 102 bridges or reconfigures the call. At this point, the SSP 102 routes the call as if it received an Analyze_Route message, using the CalledPartyID in the Forward_Call message to identify the new party. In the first embodiment described above, the CallingPartyID is the DN to which the termination attempt trigger is assigned or the DN associated with the Trunk_Group. In the second embodiment, the redirecting number is the DN to which the termination attempt trigger is assigned or the DN associated with the Trunk_Group. The SSP 102 forwards the call to the CSN 112.

At step 210, the forwarded call is answered by the CSN 112. The CSN 112 is operative to generate an announcement that is transmitted to the calling telephone station 118. In the illustrated embodiment, the announcement is a request which is tailored according to called party requirements. One example of a suitable announcement is "The party you are calling does not accept calls from unidentified numbers. At the tone, say your name or the company you represent and your call will be completed." This may be the default message.

After transmission of the announcement to the calling party, the CSN 112 then detects a response. If the calling party provides a response, the response is recorded as audible caller identification information for subsequent playback to the called party. If no response is provided, the call is terminated.

At step 212, the CSN 112 originates a new call to the called telephone station 116. In the first embodiment described above, the CSN 112 originates the new call to the DN found in the CallingPartyID parameter of the Forward_Call response message. The parameter was set to the DN to which the Termination_Attempt trigger or the Trunk_Group trigger is assigned. In the second embodiment described above, the CSN 112 originates the new call using the DN found in the RedirectingPartyID parameter of the Forward_Call response message. The parameter was set to the DN to which the Termination_Attempt trigger or the Trunk_Group trigger is assigned.

At step 214, the SSP 102 recognizes that a trigger is assigned to the called DN. If the called DN is a conventional subscriber loop, the trigger will be a Termination_Attempt trigger. If the called DN is a subscriber associated with private trunk group facilities, as in the illustrated embodiment, the trigger will be a Trunk_Group trigger. Based on the trigger, the SSP 102 creates a Termination_Attempt query message and transmits the query message to the SCP 106 for analysis. The parameters required for the AIN release 0.1 TCAP query message in the illustrated embodiment are as follows:

| | |
|---|---|
| UserID | DN to which the trigger is assigned (Called DN) |
| BearerCapability | 01 (3.1 KHz) |
| CalledPartyID | DN to which the trigger is assigned (Called DN) |
| Lata | Local Access and Transport Area of the Called DN |
| TriggerCriteriaType | 15 (terminating attempt, if a Terminating_Attempt trigger was encountered) 48 (terminating attempt, if a Trunk_Group trigger was encountered) |
| CalledPartyStationType | Originating Line information of the called DN |
| ChargeNumber | ANI of the originating facility |
| CallingPartyID | DN of the calling party (CSN DN) |
| Presentation Restriction | 00 (Presentation Allowed) |
| ChargePartyStationType | Originating Line information of the calling DN |

At step 216, the service logic of the SCP 106 will validate the Presentation Restriction Indicator of the CallingPartyID parameter of the query message. If the indicator is equal to Presentation Allowed, the SCP 106 will create an Authorize_Termination response message and send it to the SSP 102. The parameters required for the AIN release 0.1 TCAP response message in the illustrated embodiment are as follows:

| | |
|---|---|
| CallingPartyID | DN of the calling party (CSN DN) |
| ChargeNumber | ANI of the calling party |
| ChargePartyStationType | Originating Line information of the calling DN |
| DisplayText | CNAME information |

At step 218, when the called party answers the called telephone station 116, in the illustrated embodiment the CSN 112 first plays an identifying message and requests a keypress input. This ensures that a human is present to answer the called telephone station 116 and distinguishes the case where a modem, fax or other equipment answers the called telephone station 116. The identifying message may be in a language or format specified by the customer or called party at the time the service is ordered. If the called party accepts the call, the CSN 112 connects the original calling party at the calling telephone station 118 to the called party at the called telephone station 116.

Figure 3:
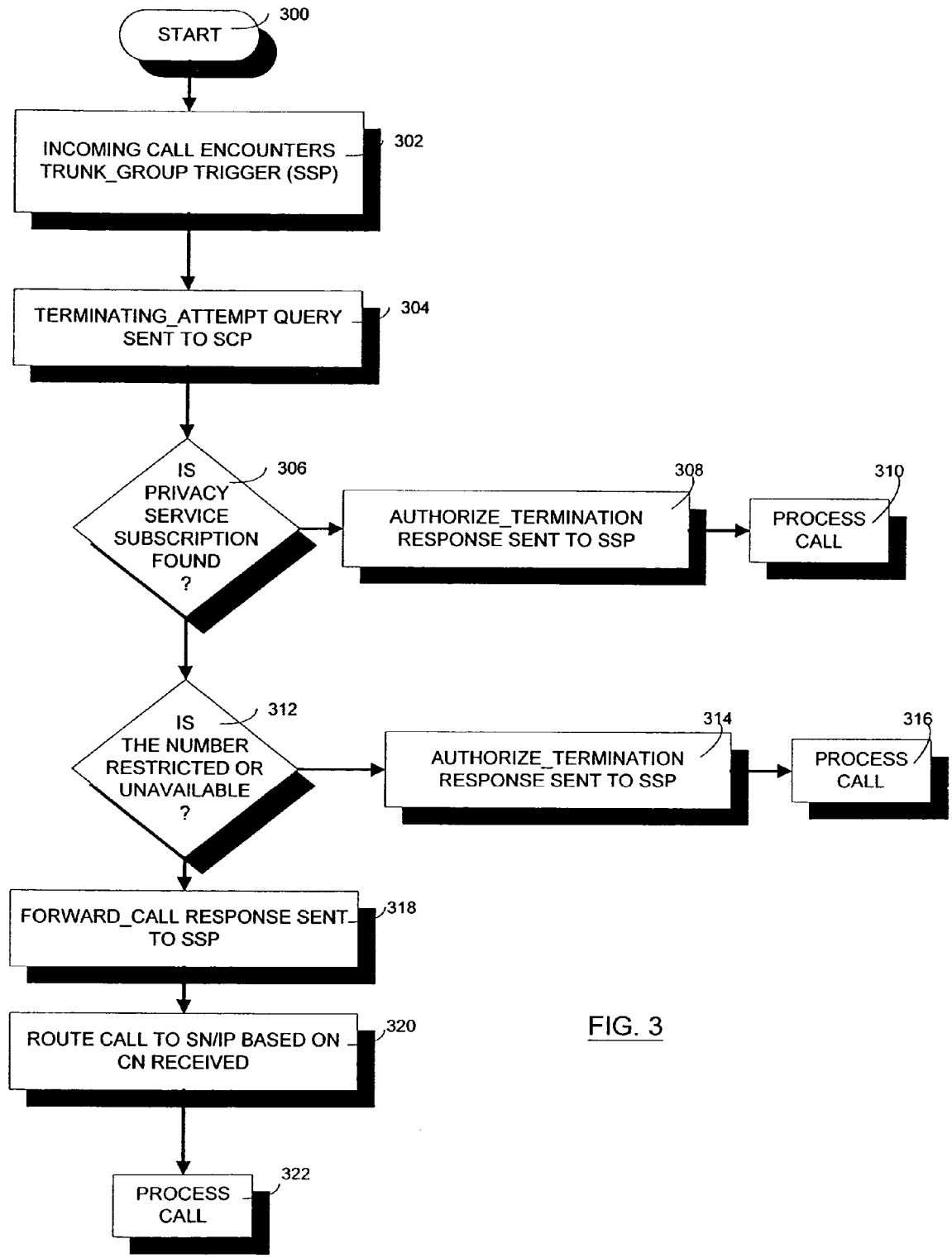
FIG. 3 is a flow diagram illustrating one embodiment of a method for providing enhanced caller identification information in accordance with the privacy management method and system of FIGS. 1 and 2.

FIG. 3 is a flow diagram illustrating one embodiment of a method for processing a call in a telecommunications system including at least one SCP, at least one SSP including a terminating SSP and private trunk facilities such as a PBX or a public trunk group. The method allows subscribers who access a network via private trunk facilities to subscribe to and benefit from a privacy service of the network. In the illustrated method, a call is placed by a calling party at a calling communication station. The call is directed to the directory number of a called party at a called communication station. The called communication station accesses the system via the private trunk facilities or public trunk group. The method begins at block 300.

At block 302, the call is received at the terminating SSP. The incoming call encounters a Trunk_Group trigger at the SSP for the called directory number. The Trunk_Group trigger is provisioned against the private trunk group facilities of the subscriber when the subscriber adds the privacy service to his account. At block 304, in response to the encountered Trunk_Group trigger, the SSP launches a Termination_Attempt query message to the SCP.

At block 306, the SCP determines if the called communication station is a subscriber to the privacy service (referred to in FIG. 3 as "APM"). The SCP in one embodiment consults a database of subscription information for the called directory number. If the called directory number is associated with a PBX, the owner of the PBX may be a subscriber and hence all DNs associated with the PBX will have the privacy service provisioned against their account. In other situations, the individual DN may or may not have a subscription to the privacy service.

If, at block 306, no subscription to the privacy service is found for the called DN, at block 308 the SCP returns an Authorize_Termination response message to the terminating SSP. The Authorize_Termination response message directs the SSP to route the call to the PBX for the called DN, using the information currently available about the calling party's identification information. At block 310, call processing continues normally.

Otherwise, at block 312, the SCP determines if standard caller identification can be provided for the calling communication station. Two examples in which standard caller identification can not be provided are cases where there is a presentation restriction or where the caller identification information is unavailable. If the Caller ID information is not unavailable, meaning it can be provided, at block 314 the SCP transmits an Authorize_Termination message to the SSP. In response to this message, the SSP will complete the call to the called directory number. The call will be routed with the caller identification information received for the call. At block 316, the call is subsequently processed normally.

If, at block 312, the standard caller identification information can not be provided, at block 318 a Forward_Call response message is sent to the SSP. In this case, the privacy service is engaged and the call is suspended until the caller provides caller identification information. At block 320, the SSP responds to the Forward_Call response message by routing the call to network equipment such as an AIN Service Node or Intelligent Peripheral, which are collectively referred to in FIG. 3 as a SN/IP. At block 322, call processing continues normally.

As can be seen from the foregoing, the present embodiments provide a system and method for delivering audible caller identification information when standard Caller ID information can not be provided, even for subscribers who access the network through private facilities or public trunk groups. For such subscribers, the Trunk_Group Trigger will be provisioned against the trunk group associated with their DN when they subscribe to the privacy service. When a call is received, the Trunk_Group trigger is encountered and an termination attempt query message is initiated to an SCP. The SCP routes the call to a service which requires that the calling party state a name for playback to the called party or enter an access code. In one particular embodiment, the SCP detects the directory number to which a terminating attempt trigger is assigned or a directory number associated with a trunk group to which a Trunk_Group Trigger is assigned and places this directory number in a parameter for transmission to the SSP using a Forward_Call message. The SCP prompts the calling party to provide audible caller identification information. The called party is then advised of the incoming call.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A telecommunications method comprising:
   detecting a call from a calling party at a calling communication station to a called party at a called communication station which is associated with a private trunk group;
   detecting a Trunk_Group Trigger for the called communication station; and
   in response to the Trunk_Group Trigger, generating a Terminating Attempt Trigger query message to request call routing information, the Terminating Attempt Trigger query message including called party identification information;
   in response to the Terminating Attempt Trigger query message, receiving call routing information;
   in response to the call routing information, originating a privacy service call to the calling party to obtain audible caller identification information.

2. The method of claim 1 wherein receiving call routing information comprises:
   receiving an Authorize_Termination response message if the called party is not a subscriber to the privacy service.

3. The method of claim 2 wherein receiving call routing information comprises:
   receiving an Authorize_Termination response message including calling party identification for the calling communication device if standard calling party identification information can be provided for the calling communication device.

4. The method of claim 3 wherein receiving call routing information comprises:
receiving a Forward_Call response message to forward the call to network equipment to originate the privacy service call if standard calling party identification information can not be provided for the calling communication device.

5. A telecommunications method comprising:
detecting a call from a calling party at a calling communication station to a called party at a called communication station associated with a private trunk group;
determining whether standard calling party identification information can be provided for the call;
if standard calling party identification information can not be provided for the call, initiating a new call from network equipment to transmit a request for audible caller identification information to the calling communication station; and
transmitting the audible caller identification information from the network equipment to the called communication station associated with the private trunk group.

6. The telecommunications method of claim 5 further comprising:
detecting call routing information associating the called communication station with the private trunk group.

7. The telecommunications method of claim 5 further comprising:
detecting a Trunk_Group Trigger associate with the called communication station.

8. The telecommunications method of claim 7 further comprising:
in response to detection of the Trunk_Group Trigger, generating a Terminating_Attempt query for the call;
in response to receipt of the Terminating_Attempt query, determining whether the standard caller identification information can be provided.

9. The telecommunications method of claim 7 wherein transmitting a request for audible caller identification information comprises:
prompting the calling party to state identifying information; and recording the stated identifying information as the audible caller identification information.

10. A method for a service control point (SCP) of telecommunications network, the method comprising:
receiving a Trunk_Group trigger query message from a calling party at a calling communication station to a called party at a called communication station which is associated with a private trunk group, Trunk_trigger query message including a CallingPartyID parameter with a Presentation Restriction parameter set to Presentation Restriction or Number unavailable; and
in response, generating a Forward_Call response message including the following parameter:
CallingPartyID directory number with the Trunk_Group trigger, with presentation allowed.

11. A method for a service control point (SCP) of telecommunications network, the method comprising:
receiving a Trunk_Group trigger query message from a calling party at a calling communication station to a called party at a called communication station which is associated with a private trunk group, the Trunk Group trigger guery message including a CallingPartyID parameter with a Presentation Restriction parameter set to Presentation Restriction or Number unavailable; and
in response, generating a Forward_Call response message including the following parameter:
RedirectingPartyID directory number associated with the Trunk_Group Trigger, with presentation allowed.

* * * * *

UNITED STATES PATENT AND TRADEMARK OFFICE
CERTIFICATE OF CORRECTION

PATENT NO. : 7,272,219 B2
APPLICATION NO. : 10/931283
DATED : September 18, 2007
INVENTOR(S) : John W. Moss et al.

It is certified that error appears in the above-identified patent and that said Letters Patent is hereby corrected as shown below:

Column 11, in claim 7, line 3, after "Trunk_Group Trigger" delete "associate" and substitute --associated-- in its place.

Column 12, in claim 10, line 6, after "trunk group," delete "Trunk_trigger" and substitute --the Trunk_Group-- in its place.

Column 12, in claim 11, lines 6-7, delete "Trunk Group trigger guery" and substitute --Trunk_Group trigger query-- in its place.

Signed and Sealed this

Eighteenth Day of December, 2007

JON W. DUDAS
*Director of the United States Patent and Trademark Office*